A. B. RECK.
APPLIANCE FOR SMOKELESS COMBUSTION.
APPLICATION FILED APR. 12, 1910.
1,029,083.
Patented June 11, 1912.
3 SHEETS—SHEET 1.
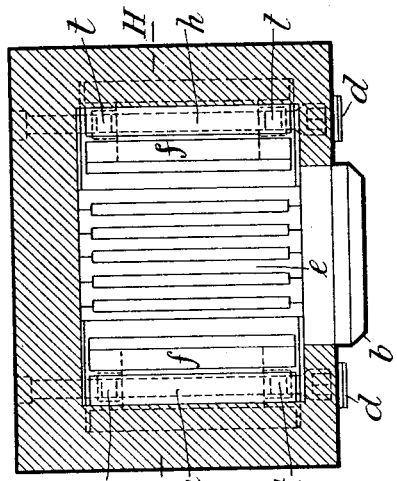
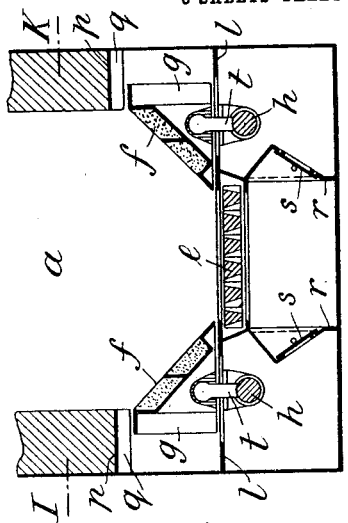
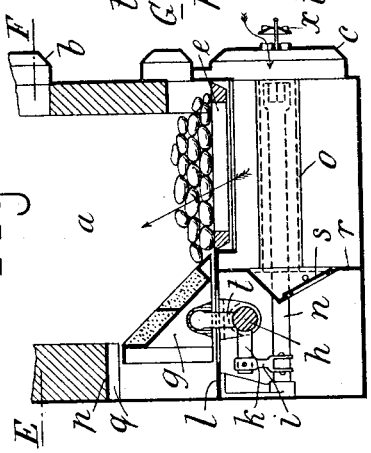
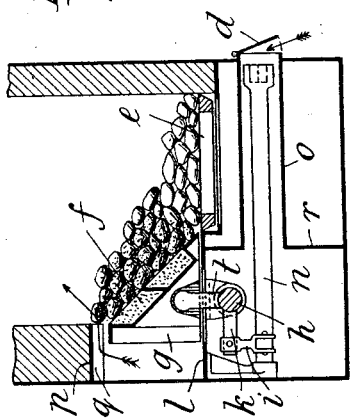
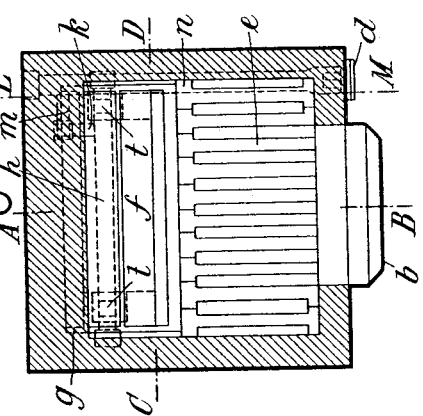
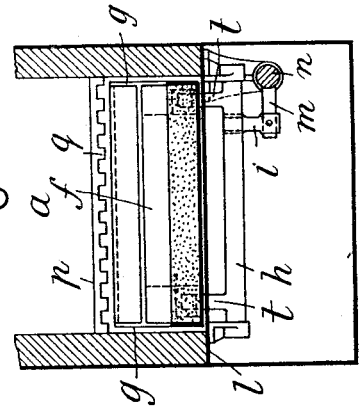
WITNESSES:
John C. Sanders
John A. Percival
INVENTOR
Anders Barch Reck
BY M. Mallan
ATTY.

A. B. RECK.
APPLIANCE FOR SMOKELESS COMBUSTION.
APPLICATION FILED APR. 12, 1910.
1,029,083.
Patented June 11, 1912.
3 SHEETS—SHEET 2.
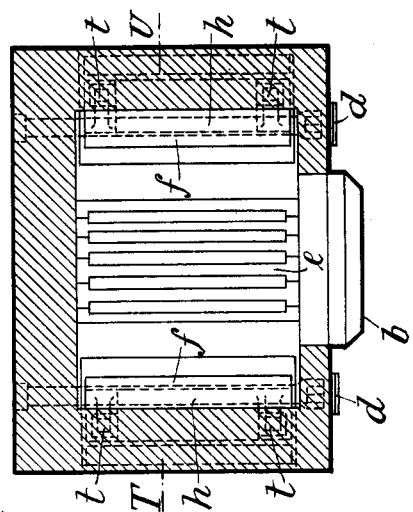
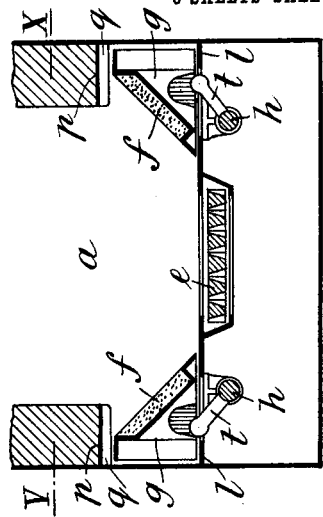
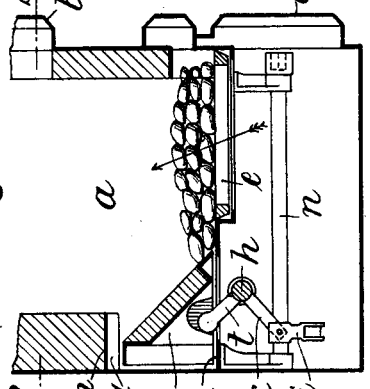
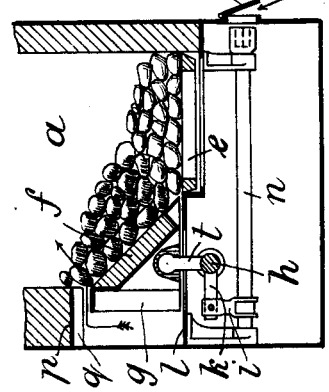
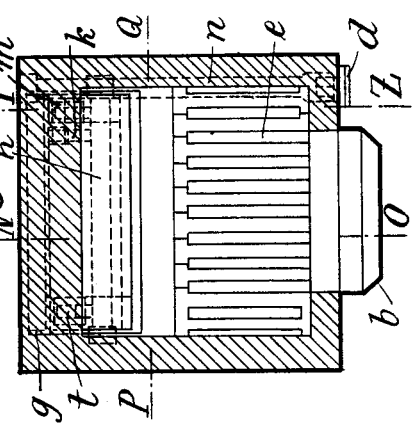
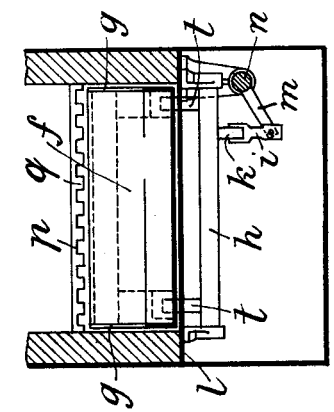

A. B. RECK.
APPLIANCE FOR SMOKELESS COMBUSTION.
APPLICATION FILED APR. 12, 1910.

1,029,083.

Patented June 11, 1912.
3 SHEETS—SHEET 3.

WITNESSES:
John C. Sanders
John A. Percival.

INVENTOR
Anders Borch Reck
BY
ATTY.

UNITED STATES PATENT OFFICE.

ANDERS BORCH RECK, OF HELLERUP, DENMARK.

APPLIANCE FOR SMOKELESS COMBUSTION.

1,029,083. Specification of Letters Patent. Patented June 11, 1912.

Application filed April 12, 1910. Serial No. 554,960.

*To all whom it may concern:*

Be it known that I, ANDERS BORCH RECK, captain, a subject of the King of Denmark, residing at Hellerup, in the Kingdom of Denmark, have invented new and useful Improvements in Appliances for Smokeless Combustion, of which the following is a specification.

In all appliances for the combustion of ordinary coal or similar gas producing combustibles it has always been the main object to consume completely the hydrocarbons so that the greatest amount of heat is obtained from the fuel.

The present invention purposes to solve this problem by combining with the usual grate a movable inclined plate carrying the fuel, and a suitably controlled air supply through the fuel supported by the said plate, this air supply being separate from that to the grate. By means of this combination a current of air can be brought to bear upon the fuel as long as the latter contains any hydrocarbons and the said current of air can be checked or wholly stopped as soon as all the hydrocarbons are consumed and only the carbon of the fuel is left.

The invention is illustrated in the accompanying drawings, wherein—

Figures 1, 2, 3 and 4 show one construction, Figs. 5 and 6 another, Figs. 7, 8, 9 and 10 a third and Figs. 11 and 12 a fourth, Figs. 13, 14, 15 and 16 a fifth.

Figure 15:
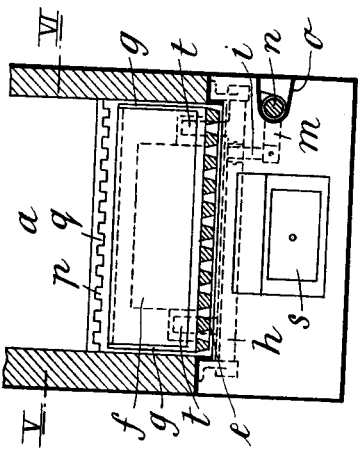
Figure 16:
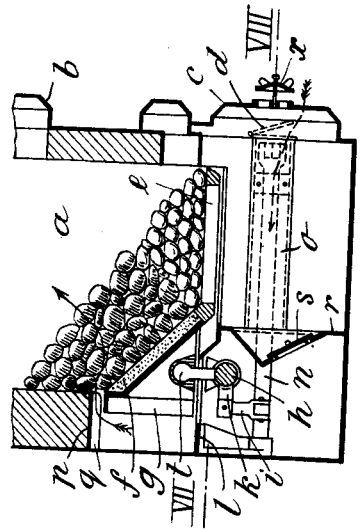
Figure 13:
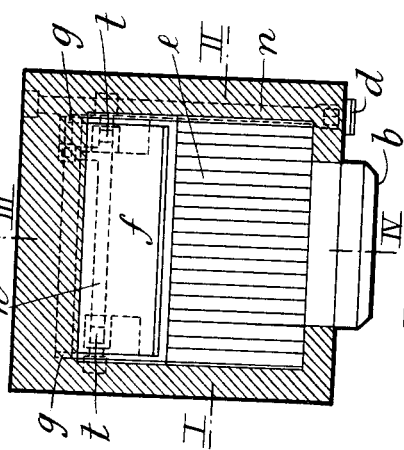
Figure 14:
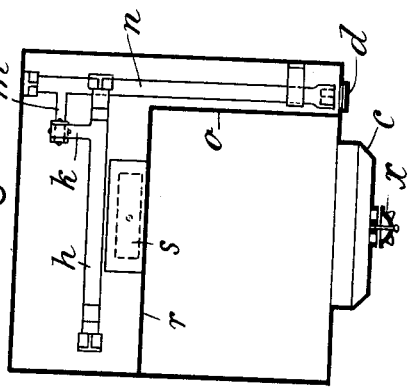

Fig. 1 is a horizontal section on line E—F of Fig. 3, Fig. 2 a vertical section on line C—D of Fig. 1, and Figs. 3 and 4 are vertical sections on lines A—B and L—M respectively of Fig. 1. Fig. 5 is a horizontal section on line I—K of Fig. 6 and Fig. 6 is a vertical section on line G—H of Fig. 5. Fig. 7 is a horizontal section on line R—S of Fig. 9, Fig. 8 is a vertical section on line P—Q of Fig. 7 and Figs. 9 and 10 are vertical sections on line N—O and line Y—Z respectively of Fig. 7. Fig. 11 is a horizontal section on line V—X of Fig. 12 and Fig. 12 is a vertical section on line T—U of Fig. 11. Fig. 13 is a horizontal section on line V—VI of Fig. 15. Fig. 14 is a horizontal section on line VII—VIII of Fig. 16 and Figs. 15 and 16 are vertical sections on lines I—II and III—IV of Fig. 13.

The furnace $a$ has a stoking door $b$ and an ash-pit door $c$. The grate $e$ is shown as an ordinary grate, but a movable grate of any pattern may be used. In the form shown in Figs. 1–4 the grate extends back to about the center of the furnace. From here there is an upwardly inclined plate $f$ having on its under surface two lugs $g$ which can slide on a supporting plate $l$. The said inclined plate $f$ can be moved forward and backward or shaken by means of a shaft $h$ movable in brackets projecting downward from the supporting plate $l$. The shaft $h$ carries two arms $t$ which engage in recesses in the under side of the lugs $g$. When the shaft is rocked the arms $t$ move the inclined plate to and fro. The shaft $h$ is provided with another arm $k$ connected by a link $i$, forked at each end, with an arm $m$ on a shaft $n$, so that when this last named shaft is rocked from outside the furnace by means of a loose key of a suitable form, the shaft $h$ is also rocked, and the plate $f$ will be reciprocated by the arm $t$ on shaft $h$.

Each of the two compartments into which the partition $r$ divides the ash-pit receives its own supply of air. The supply of air to the compartment under the grate $e$ is through the valve $x$ in the ash-pit door; the supply of air to the compartment under the inclined plate $f$ is through valve $d$ and the pipe $o$ in which shaft $n$ is situated. From the compartment of the ash-pit under the inclined plate $f$ the air passes into the interior of the furnace over the upper edge of the inclined plate between teeth $q$ on the under surface of the iron plate $p$ supporting the brick-work. These teeth $q$ present an obstacle against ashes passing over the edge of the inclined plate $f$ into the compartment below the inclined plate so that this compartment need only be cleared of ashes at intervals of several weeks through a door $s$ in the partition $r$.

With the furnace herein described stoking is effected as follows:—By reciprocating the plate $f$ the still burning fuel of a previous charge is caused to slide down on the grate $e$ as shown in Fig. 3. Here the ashes are removed from the fuel in the usual manner. If the fuel left from the previous charge after being shaken down on the grate is burning only feebly, the fire in it can quickly be blown up to a blaze by admitting air through the valve $x$ under the grate $e$. Fresh fuel is now fed in through the feed door $b$ shown in Fig. 3; this fuel is to be placed on the inclined plate $f$ behind the still burning fuel left from the previous charge. Valve $d$ is then opened to admit air over the edge of the plate $f$ through the fresh fuel as shown in Fig. 4. If the fuel contains hydrocarbons, the heat developed by the combustion on the grate $e$ will only gradually distil these hydrocarbons from the fuel as gases and these gases are burned by the air passing over the upper edge of the inclined plate. Thus the fresh fuel on the inclined plate $f$ is subjected to a gradual gasification, and the burning fuel on the grate is not suddenly cooled down by the fresh fuel, but can continue to burn undisturbed. The conditions for complete combustion are therefore the best obtainable. When it is observed that the fuel on the inclined plate $f$ is glowing throughout, all the hydrocarbons have been expelled; the valve $d$ may then be closed so that air can only pass through valve $x$ and grate $e$, as shown in Fig. 3.

While it is supposed in the foregoing that all air passing through the valve $d$ goes in over the upper edges of the inclined plate, the latter may be perforated so that some of the air passes through the openings in the plate. Openings in the inclined plate $f$ will however easily cause the trouble that ashes pass through and quickly fill the compartment under the inclined plate. Instead of having only one inclined plate as shown in Figs. 1-4, the furnace may have two inclined plates, one on each side as shown in Figs. 5 and 6. Each inclined plate $f$ has here its own shaft $h$ which can be rocked directly by a key. There are also two valves $d$ through which air passes directly into the two compartments under the two inclined plates $f$. Air is led to the grate $e$ through a valve on the ash-pit door as in the construction shown in Figs. 1-4.

By the construction shown in Figs. 7-10 the compartment under the grate $e$ is not separated from the compartment under the inclined plate $f$, as the partition $r$ and the pipe $o$ are omitted. Instead, the inclined plate as shown in Fig. 9 fits tightly against the back wall of the furnace when in its most rearward position. In this construction there is no passage for the supply of air above the inclined plate when the said plate is in its most rearward position, while as shown in Fig. 10 there is a passage for such supply of air from the ash-pit when the inclined plate is in its most forward position. Thus all the supply of air can be admitted through only one air valve, for instance through the valve $d$ shown in Fig. 10 in front of the end of the shaft $n$, but by placing the inclined plate $f$ in its most forward or most rearward position, the air for combustion can be led into the furnace either both through grate $e$, and over the edge of the inclined plate $f$, or only through grate $e$ when all hydrocarbons have been extracted from the fuel placed on the inclined plate $f$.

A furnace having two inclined plates can also be made in a similar way without the partitions $r$ and with the inclined plates arranged in such a manner that it is possible to shut off the supply of air above the inclined plates by aid of the said inclined plates themselves. Figs. 11 and 12 show such a furnace with two movable inclined plates, which fit to the side walls of the furnace in one of their positions (as shown in Fig. 12) with the same effect as that described with reference to Fig. 10. In all cases the inclined plate or plates $f$ can be covered on the upper surface with firebrick, as shown in Figs. 7-12, but it is better to make the inclined plates with flanges projecting upward along all their four sides as shown in Figs. 1-6 so that ashes will collect over the plate and so form just as good a protection as firebricks, whereas the trouble of clinkers adhering to the firebricks is avoided.

In all constructions shown in Figs. 1-12 the horizontal grate $e$ remains stationary when the inclined plate $f$ is moved backward and forward; if preferred, however, the grate $e$ or part of it, may be connected with the movable plate so that both parts move together when the inclined plate is moved. In Figs. 13-16 such a construction is shown, and by comparing Fig. 13 with Fig. 1, Fig. 15 with Fig. 2 and Fig. 16 with Figs. 3 and 4 it will be seen that the only difference between the construction shown by Figs. 1-4 and the construction shown by Figs. 13-16 is, that in the former construction the grate $e$ does not partake in the movement of the plate $f$, whereas in the latter construction, where the grate $e$ is cast in one piece with the plate $f$, the grate will be shaken together with the plate, with the result that a special mechanism for shaking the grate can be spared. The action of the shafts $n$ and $h$ for reciprocating the plate $f$ together with the grate $e$ is the same as described, where Figs. 1-4 are explained above. Fig. 14, that represents a horizontal section through the ash-pit on line VII-VIII in Fig. 16, illustrates the manner the shafts $n$ and $h$ are connected together. The connection is quite the same as illustrated by the dotted lines in Figs. 1 and 7. When it is only wished to cause the fuel to slide down the inclined plate or to clean the fuel on the grate of ashes, the shaft $n$ is only rotated a little right and left. But if it is wished to clear the fire-pot completely of all that remains in it, the shaft $n$ is rotated as far as possible in the direction opposite the hands of a watch. Then the arm $t$ on shaft $n$ will move the plate $f$ together with grate $e$ so far back that the contents of the fire-pot can be drawn forward and down into the ash-pit over the front edge of the grate $e$.

The invention is especially applicable to all kinds of heating apparatus such as stoves, fire-places, boilers or the like and may be modified in various ways especially as regards the means of moving the inclined plates, and other details.

Having now described my invention, what I claim as new and desire to secure by Letters Patent is:—

1. In apparatus of the class described, in combination a fire pot, a grate co-acting therewith for supporting fuel therein, a movable coking and fuel supporting plate extending between one of the walls of said fire pot and the said grate, said plate being inclined upwardly with respect to said grate and so positioned that the upper horizontal edge thereof adjacent the wall of the fire pot is spaced therefrom to admit air into said fire pot, means for moving said plate, means for varying the air supply to the grate, and means for varying from the outside the amount of air passing through said space over the upper edge of the movable coking plate.

2. In apparatus of the class described, in combination a fire pot, a grate co-acting therewith for supporting fuel therein, a movable coking and fuel supporting plate extending between one of the walls of said fire pot and the said grate, said plate being inclined upwardly with respect to said grate and so positioned that the upper horizontal edge thereof adjacent the wall of the fire pot is spaced therefrom to admit air into said fire pot, means for moving said plate, means for varying the air supply to the grate, and means for varying from the outside the amount of air passing through said space over the upper edge of the movable coking plate, these means being independent of the means for varying the supply of air to the grate.

3. In apparatus of the class described, in combination a fire pot, a grate co-acting therewith for supporting fuel therein, two movable coking and fuel supporting plates extending each between one of the walls of said fire pot and the said grate, said plates being inclined upwardly with respect to said grate and so positioned that the upper horizontal edges thereof adjacent the walls of the fire pot are spaced therefrom to admit air into said fire pot, means for moving said plates, means for varying the air supply to the grate and means for varying from the outside the amount of air passing through said spaces over the upper edge of the movable coking plate, these means being independent of the means for varying the supply of air to the grate.

4. In apparatus of the class described, in combination a fire pot, a grate co-acting therewith for supporting fuel therein, two movable fuel supporting plates extending each between one of the walls of said fire pot and the said grate, said plates being inclined upwardly with respect to said grate and so positioned that the edges thereof adjacent the walls of the fire pot are spaced therefrom to admit air into said fire pot, means for varying the air supply to the grate, and means independent thereof for varying the position of the movable inclined plates forward and backward, so that, when in their most rearward position, they fit tightly to the walls of the furnace and so themselves control the passage of air into the fire pot.

5. In apparatus of the class described, in combination, a fire pot, a grate co-acting therewith for supporting fuel therein, two movable fuel supporting plates formed as boxes with compartments open above and closed below, adapted to retain ashes, and extending each between one of the walls of said fire pot and the said grate, said plates being inclined upwardly with respect to said grate and so positioned that the edges thereof adjacent the walls of the fire pot are spaced therefrom, to admit air into said fire pot, means for moving said plates, means for varying the air supply to the grate, and means for varying from the outside the amount of air passing through said spaces, these means being independent of the means for varying the supply of air to the grate.

In testimony whereof I have signed my name to this specification in the presence of two subscribing witnesses.

ANDERS BORCH RECK.

Witnesses:
 JOHN CHRISTENSEN,
 ENGELHARD MADERN.